(12) United States Patent
Trujillo et al.

(10) Patent No.: US 12,495,311 B2
(45) Date of Patent: Dec. 9, 2025

(54) VIRTUAL PRIVATE NETWORK CLUSTER PROFILING FOR HYBRID CLOUD CELLULAR NETWORKS

(71) Applicant: DISH Wireless L.L.C, Littleton, CO (US)

(72) Inventors: Andrew Trujillo, Littleton, CO (US); Sourabh Gupta, Ashburn, VA (US); Sundeep Goswami, Leesburg, VA (US); Julio Armenta, Aldie, VA (US); Ash Khamas, Goffstown, NH (US)

(73) Assignee: DISH Wireless L.L.C, Littleton, CO (US)

( * ) Notice: Subject to any disclaimer, the term of this patent is extended or adjusted under 35 U.S.C. 154(b) by 558 days.

(21) Appl. No.: 17/960,254

(22) Filed: Oct. 5, 2022

(65) Prior Publication Data

US 2023/0107080 A1    Apr. 6, 2023

Related U.S. Application Data

(60) Provisional application No. 63/252,942, filed on Oct. 6, 2021.

(51) Int. Cl.
*H04W 16/24* (2009.01)
*H04L 9/40* (2022.01)
(Continued)

(52) U.S. Cl.
CPC ......... *H04W 16/24* (2013.01); *H04L 41/0895* (2022.05); *H04L 45/50* (2013.01);
(Continued)

(58) Field of Classification Search
CPC ... H04W 28/0861; H04W 16/24; H04W 4/90; H04W 40/02; H04W 48/18; H04W 88/16;
(Continued)

(56) References Cited

U.S. PATENT DOCUMENTS 10,555,165 B2   2/2020   Shekhar et al.
10,805,171 B1   10/2020  Bilal et al.
(Continued)

FOREIGN PATENT DOCUMENTS

CN         107787571 A        3/2018

OTHER PUBLICATIONS

"Amazon Virtual Private Cloud: User Guide", Available online at: URL:https://web.archive.org/web/20170121164746/https://docs.aws.amazon.com/AmazonVPC/latest/UserGuide/vpc-ug.pdf, 2017, pp. 1-279.

(Continued)

*Primary Examiner* — Diane D Mizrahi
(74) *Attorney, Agent, or Firm* — Kilpatrick Townsend & Stockton LLP

(57) ABSTRACT

Arrangements for using a virtual private network via a cellular network are detailed herein. A cellular network can receive, from a client, various characteristics. The cellular network can be used to identify a cluster template based on the characteristics. The cellular network can then instantiate a cluster based on the cluster template on a public cloud computing platform. Access, via a radio access network (RAN) of the cellular network can then be provided to one or more client services executed within the cluster on the public cloud computing platform.

9 Claims, 5 Drawing Sheets

(51) Int. Cl.
*H04L 41/0895* (2022.01)
*H04L 45/50* (2022.01)
*H04L 45/586* (2022.01)
*H04L 45/76* (2022.01)
*H04L 47/125* (2022.01)
*H04W 4/90* (2018.01)
*H04W 28/086* (2023.01)
*H04W 40/02* (2009.01)
*H04W 48/18* (2009.01)
*H04W 88/16* (2009.01)

(52) U.S. Cl.
CPC ............ *H04L 45/586* (2013.01); *H04L 45/76* (2022.05); *H04L 47/125* (2013.01); *H04L 63/0272* (2013.01); *H04W 4/90* (2018.02); *H04W 28/0861* (2023.05); *H04W 40/02* (2013.01); *H04W 48/18* (2013.01); *H04W 88/16* (2013.01)

(58) Field of Classification Search
CPC ..... H04L 45/76; H04L 41/0895; H04L 45/50; H04L 45/586; H04L 47/125; H04L 63/0272; H04L 41/40
See application file for complete search history.

(56) References Cited

U.S. PATENT DOCUMENTS

| | | |
|---|---|---|
| 2004/0174900 A1 | 9/2004 | Volpi et al. |
| 2012/0259970 A1 | 10/2012 | Hu et al. |
| 2015/0264122 A1* | 9/2015 | Shau ..................... H04L 69/40 709/203 |
| 2016/0080172 A1 | 3/2016 | Uberoy et al. |
| 2017/0339600 A1 | 11/2017 | Roeland et al. |
| 2020/0125389 A1 | 4/2020 | Palermo et al. |
| 2020/0136911 A1 | 4/2020 | Assali et al. |
| 2020/0273314 A1 | 8/2020 | Bordeleau et al. |
| 2021/0044567 A1 | 2/2021 | Hu et al. |
| 2021/0135957 A1 | 5/2021 | Thakkar et al. |
| 2021/0168653 A1 | 6/2021 | Arnold et al. |
| 2021/0204200 A1 | 7/2021 | Krishan et al. |
| 2021/0274266 A1 | 9/2021 | Lohmar et al. |
| 2021/0329098 A1 | 10/2021 | Rodrigo et al. |
| 2021/0351997 A1 | 11/2021 | Luft et al. |
| 2022/0078091 A1 | 3/2022 | Qiu et al. |
| 2022/0103985 A1 | 3/2022 | Khasnabish et al. |
| 2022/0272043 A1 | 8/2022 | Mishra et al. |
| 2022/0311744 A1 | 9/2022 | Shevade et al. |
| 2024/0031908 A1 | 1/2024 | Grewal et al. |
| 2024/0196319 A1 | 6/2024 | Nakazato et al. |
| 2024/0205522 A1 | 6/2024 | Spaas et al. |
| 2024/0276301 A1 | 8/2024 | Zhu et al. |
| 2024/0323089 A1 | 9/2024 | Baba |

OTHER PUBLICATIONS

M. Ivezic, "Introduction to 5G Core Service-Base Architecture Components", pp. 1-23, 27 (Sep. 2020).
"Discussion on Context data stored in UDR", 3GPP TSG CT4 Meeting #83, Montreal CA, Feb. 26-Mar. 2, 2018, Doc No. C4-182061, pp. 1-2 (Year: 2018).
"Cloud Platform Reference Designs," O-RAN.WG6.CLOUD-REF-v02.00, Technical Specification, 2020, 43 pages.
"O-RAN Working Group 1 Study on O-RAN Slicing," O-RAN.WG1.Study-on-O-RAN-Slicing-v02.00, Technical Report, 2020, 29 pages.
International Search Report and Written Opinion for PCT/US2022/045861 mailed Mar. 6, 2023, all pages.
International Search Report and Written Opinion for PCT/US2022/045859 mailed Jan. 13, 2023, all pages.
International Search Report and Written Opinion for PCT/US2022/045863 mailed Mar. 10, 2023, all pages.

\* cited by examiner

VIRTUAL PRIVATE NETWORK CLUSTER PROFILING FOR HYBRID CLOUD CELLULAR NETWORKS

CROSS-REFERENCE TO RELATED APPLICATION

This application claims priority to U.S. Provisional Patent Application No. 63/252,942, entitled "Cellular Network Virtualization using Cloud Platforms," filed Oct. 6, 2021, the entire disclosure of which is hereby incorporated by reference for all purposes.

BACKGROUND

Building and maintaining a private network can be a hardware-intensive task. Such hardware may require administrators to set up and maintain. The amount of processing and storage capabilities may scale relative to the size of the organization. By utilizing a cellular network platform, enhanced capabilities can be realized over a cloud computing platform.

SUMMARY

Various embodiments are described related to a method for using a virtual private network. In some embodiments, a method for using a virtual private network is described. The method may comprise receiving, by a cellular network from a client, a plurality of characteristics. The method may comprise identifying, by the cellular network, a cluster template based on the plurality of characteristics. The method may comprise instantiating, by the cellular network, a cluster based on the cluster template on a public cloud computing platform. One or more client services may be executed within the instantiated cluster on the public cloud computing platform. The method may comprise executing, within the cluster, a client service. The method may comprise providing, via a radio access network (RAN) of the cellular network, access to the one or more client services executed within the cluster instantiated based on the cluster template.

Embodiments of such a method may include one or more of the following features: instantiating, by the cellular network, a second cluster based on a second cluster template on the public cloud computing platform. An additional client service may be executed within the second instantiated cluster on the public cloud computing platform. The cluster is instantiated having parameters that may define a first performance level and the second cluster is instantiated having parameters that may define a second performance level. The second performance level of the second cluster may comprise a greater amount of processing resource than the first performance level of the cluster. The second performance level of the second cluster may comprise a greater amount of memory than the first performance level of the cluster. The public cloud computing platform may host a cellular network core for the cellular network. The cellular network core may communicate direct with the one or more client services on the public cloud computing platform. The method may further comprise accessing, by a client device, via the RAN of the cellular network, the one or more client services executed within the cluster on the public cloud computing platform. The public cloud computing platform may be operated by an entity distinct from a cellular network operator that may operate the cellular network. Instantiating may be performed by a client service manager executed on the public cloud computing platform on behalf of the cellular network. The cellular network may be a 5G New Radio (NR) cellular network.

In some embodiments, a virtual private network system implemented using a hybrid cloud cellular network is described. The system may comprise a hybrid cellular network. The system may comprise a radio access network (RAN) that may comprise a plurality of base stations. Each base station may comprise a radio unit (RU); antenna; and distributed unit (DU). The hybrid cellular network may comprise a cellular network core executed on a public cloud computing platform. The cellular network core may communicate with the plurality of base stations. The network may comprise a client service manager system executed as part of the hybrid cellular network. The client service manager system may be configured to receive a plurality of characteristics from a client. The client service manager system may be configured to identify a cluster template based on the plurality of characteristics. The client service manager system may be configured to instantiate a cluster based on the cluster template on the public cloud computing platform. One or more client services may be executed within the instantiated cluster on the public cloud computing platform. The client service manager system may be configured to execute, within the cluster, a client service. Access to the one or more client services executed within the cluster instantiated based on the cluster template may be provided via the RAN of the hybrid cellular network.

Embodiments of such a system may include one or more of the following features: the client service manager system may be further configured to instantiate a second cluster based on a second cluster template on the public cloud computing platform. An additional client service may be executed within the second instantiated cluster on the public cloud computing platform for the client. The cluster is instantiated having parameters that may define a first performance level and the second cluster is instantiated having parameters that may define a second performance level. The second performance level of the second cluster may comprise a greater amount of processing resource than the first performance level of the cluster. The second performance level of the second cluster may comprise a greater amount of memory than the first performance level of the cluster. The cellular network core may communicate directly with the one or more client services on the public cloud computing platform. The system may further comprise a client device. The client device may access, via the RAN of the hybrid cellular network, the one or more client services executed within the cluster on the public cloud computing platform. The cloud computing platform may be operated by an entity distinct from a cellular network operator that may operate the hybrid cellular network. The hybrid cellular network may be a 5G New Radio (NR) cellular network.

BRIEF DESCRIPTION OF THE DRAWINGS

The present disclosure is described in conjunction with the appended figures. In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

In arrangements detailed herein, a cellular network provider system can serve to host a virtual private network for various clients. The cellular network can be a hybrid cellular network that includes a physical radio access network (RAN) but relies on a public cloud computing platform to host various network functions (NFs), such as core cellular network functions.

The cellular network provider can use a defined bank of templates to instantiate clusters on the cloud computing platform to host client services. These templates can be predefined based on the services used by clients having similar characteristics (e.g., size, line of business, geographic footprint, etc.). Rather than the client having to coordinate their own hosting of services on the public cloud computing platform and manually define clusters, the cellular network operator can instantiate the client's needed services using predefined cluster templates. Additionally, the cellular network operator provides access to the services via the cellular network. Such an arrangement can make the client's virtual network substantially more available to the client over a geographic region, such as by taking advantage of the RAN of the cellular network.

Figure 1:
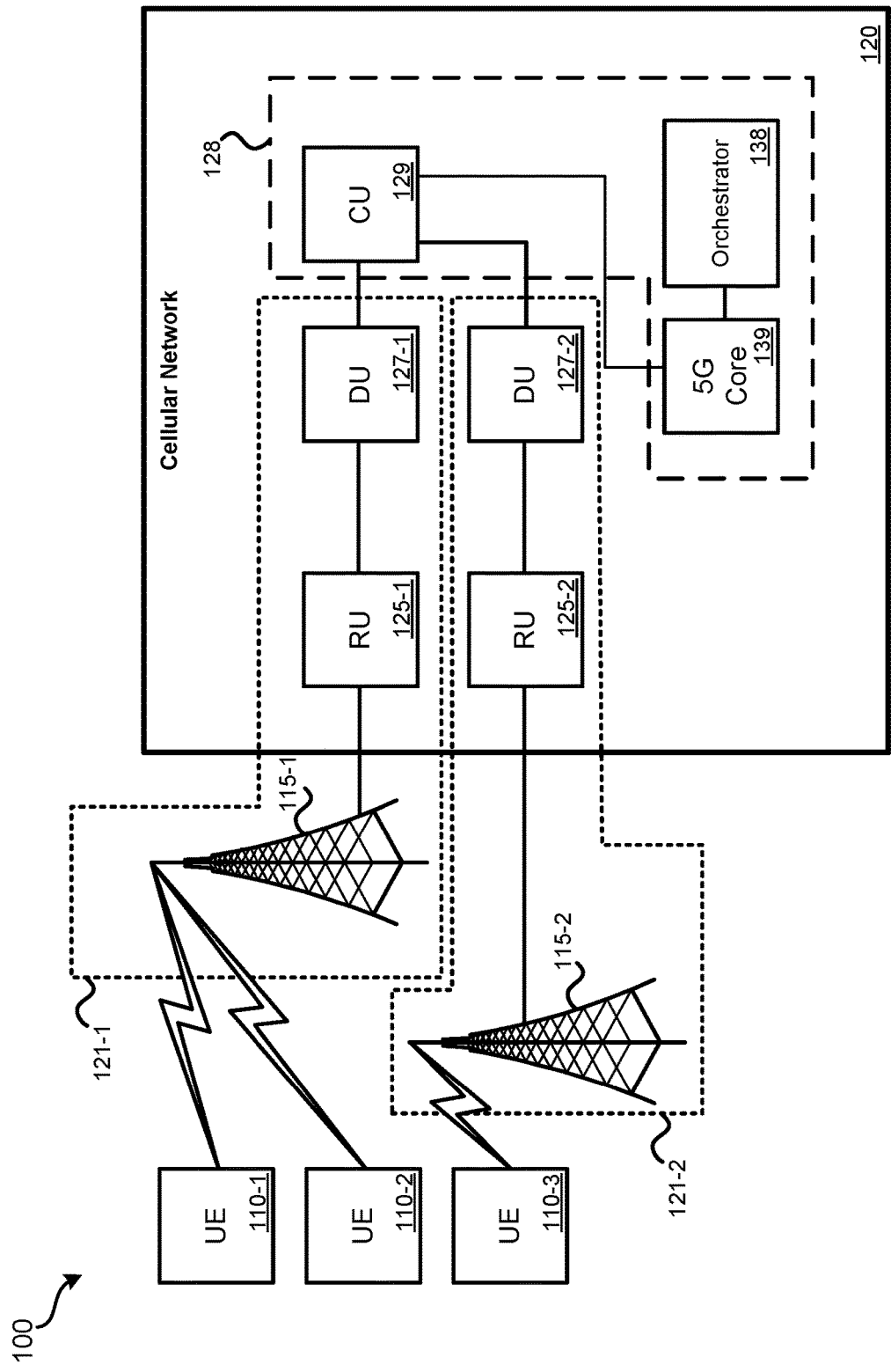
FIG. 1 illustrates an embodiment of a hybrid cloud cellular network system.

These and other embodiments are detailed in relation to the figures. FIG. 1 illustrates a block diagram of a hybrid cellular network system ("system 100"). Such a hybrid cellular network system is partially implemented using specialized hardware and partially implemented using virtualized cellular network components on a cloud-computing platform, such as Amazon Web Services (AWS). System 100 can include a 5G New Radio (NR) cellular network, but other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components can be implemented as specialized software executed on general-purpose hardware, except for components that need to receive and transmit RF, the functionality of the various components can be executed by general-purpose servers. The hardware of the cloud-computing platform may be maintained by a separate cloud-service computing platform provider. Therefore, the cellular network operator may operate some hardware, such as base stations that include RUs and local computing resources on which DUs are executed, such components may be in communication with a cloud-computing platform on which other cellular network functions, such as the cellular network core and higher-level RAN components, such as CUs, are executed.

UE 110 can represent various types of end-user devices, such as cellular phones, smartphones, cellular modems, cellular-enabled computerized devices (e.g., laptop computers), sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same datacenter as where 5G core 139 is executed, while other functions are executed at a separate data center or on a separate cloud computing system. In the illustrated embodiment of system 100, cloud-computing platform 128 can execute CU 129, 5G core 139, and orchestrator 138. As examples, 5G core 139 can include NFs such as: a session management function (SMF), a network repository function (NRF), a charging function (CHF), a policy control function (PCF), a unified data management (UDM) function, an authentication server function (AUSF); and an accessibility and mobility management function (AMF). The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed on the cloud computing platform to meet or attempt to meet service level agreements (SLAs) across slices of the cellular network.

Orchestrator 138 can allow for the instantiation of new cloud-based components of cellular network 120. As an example, to instantiate a new CU for test, orchestrator 138 can perform a pipeline of calling the CU code from a software repository incorporated as part of, or separate from cellular network 120; pulling corresponding configuration files (e.g. helm charts); creating Kubernetes nodes/pods; loading CU containers; configuring the CU; and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable. Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter. Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
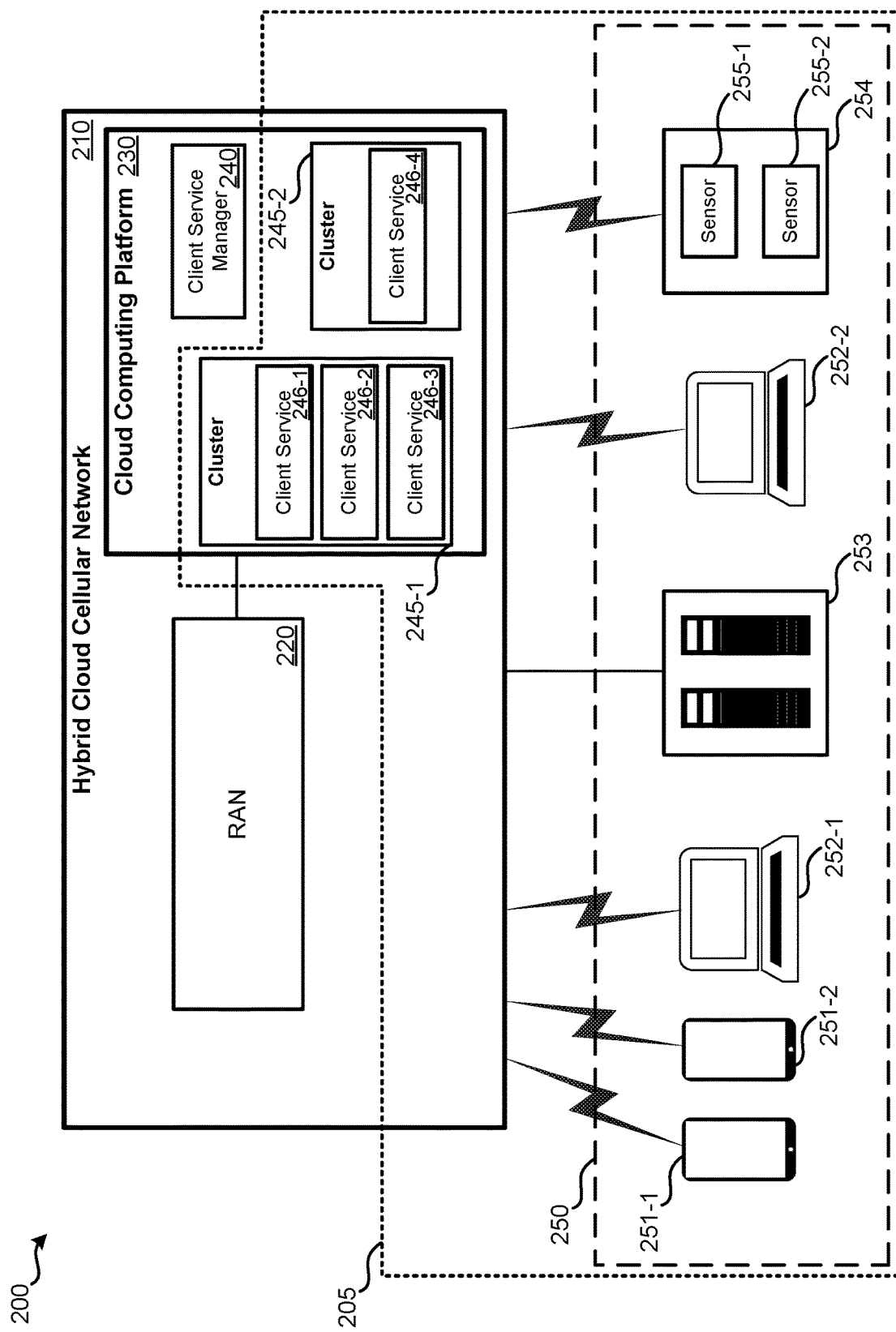
FIG. 2 illustrates an embodiment of a virtual private network implemented using a hybrid cloud cellular network.

FIG. 2 illustrates an embodiment of a virtual private network system 200 ("system 200") implemented using a cellular network, such as the hybrid cloud cellular network of system 100. System 200 can include: virtual network 205; hybrid cloud cellular network 210; RAN 220; cloud computing platform 230; clusters 245; and networked client devices 250 (smartphones 251; laptops 252; server system 253; and sensor system 254).

System 200 includes hybrid cloud cellular network 210, which can be as detailed in relation to system 100 of FIG. 1. In general, virtual network 205 allows for the networked client devices to access client services 246 as if the services and client devices were connected to a shared physical network. A service, for example, may be a software-based application that can be accessed or used by many devices. Only devices operated by the client are permitted access to virtual network 205, communicate with other devices also on virtual network 205, and communicate with client services 246. Therefore, while hybrid cloud cellular network 210 may be used to host many different virtual private networks for different clients, a device is only permitted access to the corresponding client's virtual network. Communications with the virtual network may be encrypted.

The hybrid cloud cellular network includes RAN 220, which can be used to allow some or all of the networked client devices to access client services executed on cloud computing platform 230. RAN 220 can allow for access to cloud-hosted client services when within a coverage area of the RAN. RAN 220 may be used to access client services 246 by client devices when other connections, such as a wired network connection or WiFi network is unavailable.

Within virtual network 205, various forms of devices can be used. By way of example, multiple smartphones 251 are illustrated. In other embodiments, gaming devices, cellular modems, cellular phones, tablet computers, streaming devices or various other devices that have the ability to communicate with RAN 220 may be used. Such devices may access virtual network 205 at least some of the time via RAN 220. Such devices may at other times access private network 205 via a wired local area network connection or wireless local area network that is in communication with cloud computing platform 230. For example, a business may have a wired LAN and wireless LAN on-site at an office. When within the office, one of these networks may be used to access virtual private network 205. Outside of the office, virtual network 205 may be accessed by such devices via RAN 220. Some forms of devices may be permanently connected with a wired connection of either hybrid cloud cellular network 210 or cloud computing platform 230 (possibly via the Internet). For example, server system 253 of a client may host data that the client does not have hosted by cloud computing platform 230, but by connecting through hybrid cloud cellular network 210 or via cloud computing platform 230, access to virtual network 205 can be provided. In addition or alternate to server system 253, various desktop computer systems may be present, such as in an office of the client.

Devices such as sensor system 254 (shown as including sensor 255-1 and sensor 255-2) may communicate via RAN 220 exclusively. For example, sensors may be installed at a remote site and may use RAN 220 to report data, connect with virtual network 205 and communicate with client services 246.

Cloud computing platform 230, which can be a public cloud computing platform, can be operated by a separate entity than hybrid cloud cellular network 210. For example, cloud computing platform 230 can represent Amazon Web Services (AWS) or some other public cloud computing platform on which multiple unrelated entities can establish a separate account. For each separate account, one or more virtual private clouds (VPCs) are maintained that isolates an entity's data from the data of other unrelated entities. The entity operating hybrid cloud cellular network 210 can provision resources on cloud computing platform 230 such as via one or more paid accounts. As part of hybrid cloud cellular network 210, client service manager 240 may be operated on cloud computing platform 230. Further detail regarding client service manager 240 is provided in relation to FIG. 3.

In other embodiments cloud computing platform 230 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

On behalf of a particular client, such as the client on whose behalf virtual network 205 is operated, one or more clusters on cloud computing platform 230 can be instantiated. These clusters may be instantiated under an account or service agreement of hybrid cloud cellular network 210 which also maintains an account associated with the particular client. Therefore, from the client's point-of-view, its account may be maintained with hybrid cloud cellular network 210.

A "cluster" is defined in a cloud computing environment as a logical grouping of services that are run on physical infrastructure that is registered to the particular cluster. Therefore, services run as part of the same cluster can be expected to be executed on either the same hardware or hardware that can communicate with each other with low latency (e.g., multiple servers connected via a high-speed LAN). Clusters can have different characteristics which control the amount of physical resources made available to tasks or services executed within the cluster. Characteristics can include: an amount of processing resources; an amount of memory resources; an amount of uplink bandwidth; an amount of downlink bandwidth; and a maximum amount of latency. Therefore, a service that requires a large amount of processing resources may have its own defined cluster or be defined within a cluster that has been assigned enough processing resources to handle the service and one or more additional services within the cluster.

Within each cluster, one or more client services may be executed. The number of services executed for a client within a cluster may be dependent on: the operating requirements of each service; the amount of traffic expected for each service; and/or the type of service. Client service manager 240 can instantiate one or more clusters, as needed, to host services for virtual network 205. Client service manager 240 can leverage information gained from many clients of the hybrid cloud cellular network 210, thereby allowing optimized clusters to be created for virtual network 205 that the client would otherwise not be aware of how to configure.

In system 200, clusters 245 are only available as part of virtual network 205 hosted by hybrid cloud cellular network 210. Cluster 245-1 has been instantiated using cloud computing platform 230 and executes three client services: client service 246-1; client service 246-2; and client service 246-3. Cluster 245-2 has been instantiated using a different set of parameters from cluster 245-1 and, in this example, only executes client service 246-4. Further detail regarding the instantiation and characteristics of each of clusters 245 is provided in relation to FIG. 3.

Figure 3:
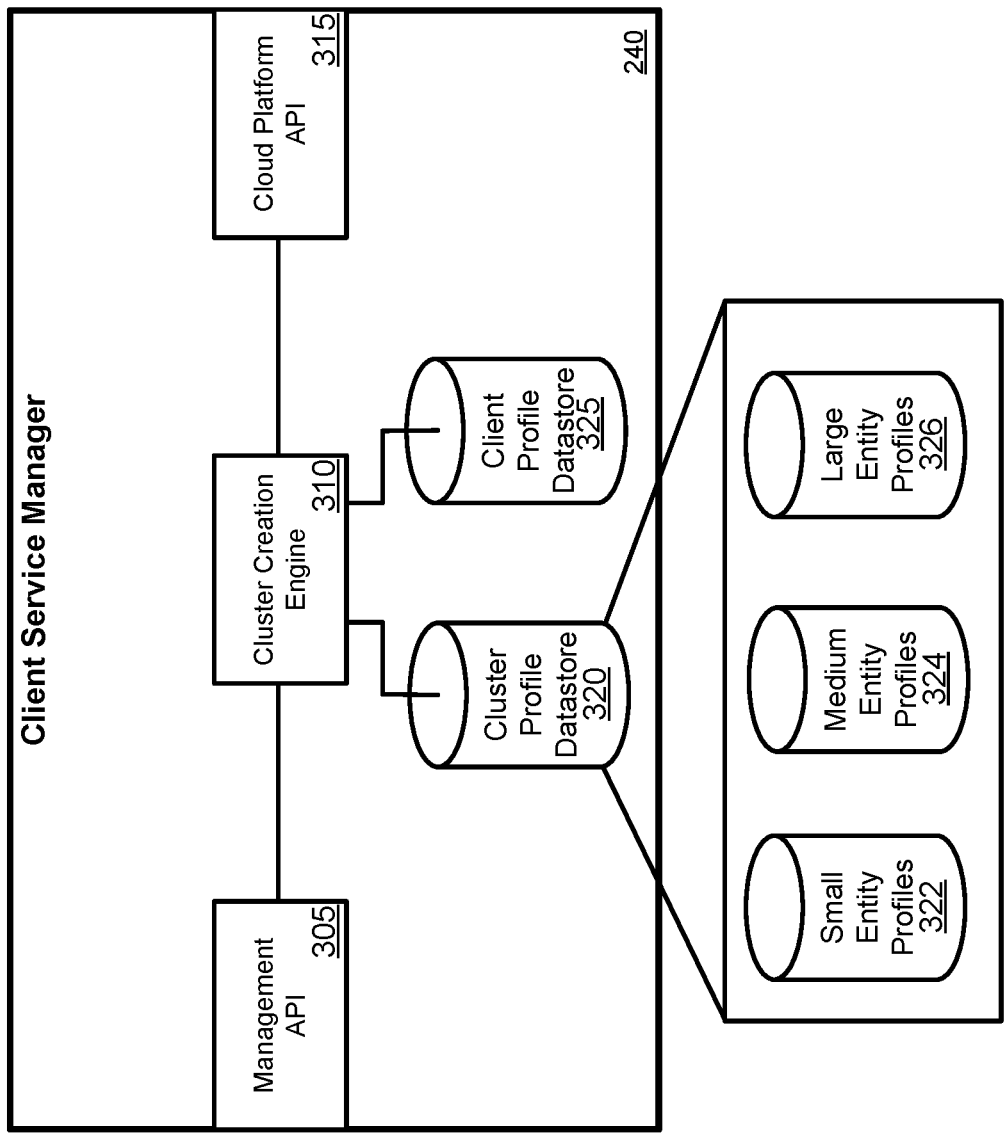
FIG. 3 illustrates an embodiment of a client service manager system for implementing a virtual private network using cluster templates.

FIG. 3 illustrates an embodiment of a client service manager 240 ("manager 240") for implementing a virtual private network using cluster templates. Manager 240 can include management application programming interface (API) 305; cluster creation engine 310; cloud platform API 315; cluster profile datastore 320; and client profile datastore 325. Manager 240 can be implemented as software executed on cloud computing platform 230. Alternatively, manager 240 can be implemented on hardware separate from the cloud computing platform, but still used to instantiate clusters and services on the cloud computing platform. For example, referring to FIG. 2, a computer system within hybrid cloud cellular network 210 but outside of cloud computing platform 230 can be configured to perform the functions of manager 240.

Management API 305 may serve as an interface between manager 240, administrators of the cellular network and, possibly, client systems. Management API 305 can be used to gather characteristic data about clients that is used by cluster creation engine 310 to create profiles and select profiles. The characteristics received by management API 305 can include, for a particular client: number of devices; type of devices; services to be provided to devices; geographic region; number of employees; business area; service level agreement (SLA) requirements, such as regarding latency, bandwidth, jitter, etc.; and services to be executed in the cloud.

Cluster creation engine 310 can access cluster profile datastore 320 and client profile datastore 325 to create and select cluster profiles. Cluster profile datastore 320 may be used to store and classify created cluster profiles that can be used to instantiate clusters on the cloud computing platform. Client profile datastore 325 can be used to store characteristic data about individual clients, such as that data received via management API 305.

Cloud platform API 315 can be used by cluster creation engine 310 to instantiate clusters, containers, and services on the cloud computing platform. Once the clusters have been instantiated and configured; control for the individual services may be performed by the client or by the cellular network operator on behalf of the client.

In FIG. 3, cluster profile datastore 320 is subdivided into three groups of profiles: small entity profiles 322; medium entity profiles 324; and large entity profiles 326. While a small entity and a large entity may use a same service, the cluster within which the service is executed may need to be configured differently in order to accommodate the increased processing, memory, and/or bandwidth requirements of the larger entity. Cluster profile datastore 320 may further include information on which services should be executed within a same cluster, and which services should be executed in separate clusters. For example, due to latency requirements, certain services should be executed within a same cluster. While FIG. 2 illustrates profiles being grouped for different size entities, templates may be grouped based on services, number of UE, and various other characteristics. In some embodiment, a clustering algorithm can be used to group cluster profiles together that would be useful for a client based on multiple characteristics of the client. For example, a particular group of cluster profiles may be made that are recommended for certain services based on: the number of UE of the client; and the business area of the client. Such cluster profiles can be useful for any entity that: 1) uses the same or similar services; 2) has a similar number of UE (e.g., within 20%; and 3) is in the same or a similar business area.

As a simple example, for a same service, a first cluster profile and a second cluster profile may be defined and stored in cluster profile datastore 320. The first cluster profile may define a "base" level of performance for a cluster that is sufficient for entities with fewer than one thousand devices that use the service. The second cluster profile may define an "enhanced" level of performance for a cluster that is sufficient for entities with more than one thousand devices that use the particular service. The cluster profiles may define an amount of: processing resources, memory, and bandwidth that is reserved when the cluster profile is instantiated. In this example, the second cluster profile involves more processing resources, memory, bandwidth, or some combination thereof being reserved compared to the first cluster profile. The cluster profiles may further define one or more other services that either should or should not be instantiated as part of the same cluster. For example, the enhanced cluster profile may be used for services that are executed in isolation, while the base cluster profile can be used for services that are executed together. There may be many more than two defined cluster profiles in other embodiments.

Client profile datastore 325 may be updated so that currently instantiated clusters for a client are mapped to the characteristics of the client. This data can be used to create and update the cluster templates stored as part of cluster profile datastore 320.

Figure 4:
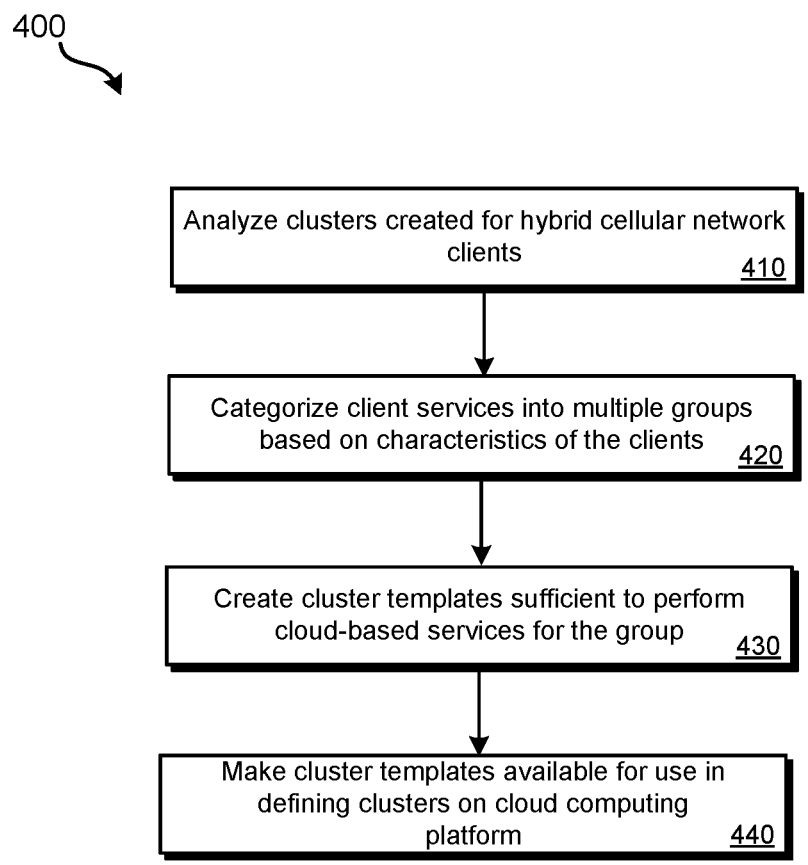
FIG. 4 illustrates an embodiment of a method for creating virtual private network templates.

Various methods may be performed using the systems and arrangements detailed in relation to FIGS. 1-3. FIG. 4 illustrates an embodiment of a method 400 for creating private network cluster templates. Method 400 can be performed using system 100, system 200, and manager 300. Specifically, each block of method 400 can be performed using client service manager 240, which can be executed directly on the cloud computing platform or on a computing system in communication with the cloud computing platform.

At block 410, clusters previously instantiated for clients of the hybrid cellular network may be analyzed. For each of these clusters, various parameters of the clusters can be gathered and analyzed, including: which services are performed within clusters; which services are grouped together (or isolated) on a cluster; processing resources reserved for the cluster; memory resources reserved for the cluster; bandwidth reserved for the cluster; and storage space reserved for the cluster.

At block 420, characteristics of the clients may be gathered or accessed and used to classify the clusters that have been instantiated on behalf of the clients. These characteristics can include: business line of the clients; size of the clients (e.g., number of devices that use each service, number of employees that use each service); geographic footprint of the clients; and parameters of slices defined for devices of the clients on the cellular network (e.g., quality of experience (QoE) and/or quality of service (QoS) parameters used to create a slice for the client on the cellular network).

At block 430, by analyzing clusters and characteristics of many clients, some number of cluster templates can be created that can be used for future clients. A clustering algorithm may be applied at block 430 to group clients and their defined clusters based on many dimensions (e.g., characteristics of the slice and clients). Groups can be used to create cluster profiles that can then be used to instantiate clusters for clients in the future that have similar characteristics and services. Parameters for clusters within a group can be used to create parameters for a cluster template by: averaging a particular parameter together; using a median of the parameter; using a minimum or maximum of the parameter; or analyzing the parameters by an administrator (e.g., administrator of the cellular network) and defining a default value for the parameter.

At block 440, the defined cluster templates are mapped to the characteristics and services and are made available in a data storage arrangement for future use in defining clusters on the cloud computing platform in which services will be instantiated. The total number of cluster templates accessible by client service manager 240 may be kept relatively low (e.g., no more than 20, no more than 10, no more than 5) in order to maintain simplicity of the clusters instantiated on clients' behalf, but this number can be varied as needed by the cellular network operator.

Figure 5:
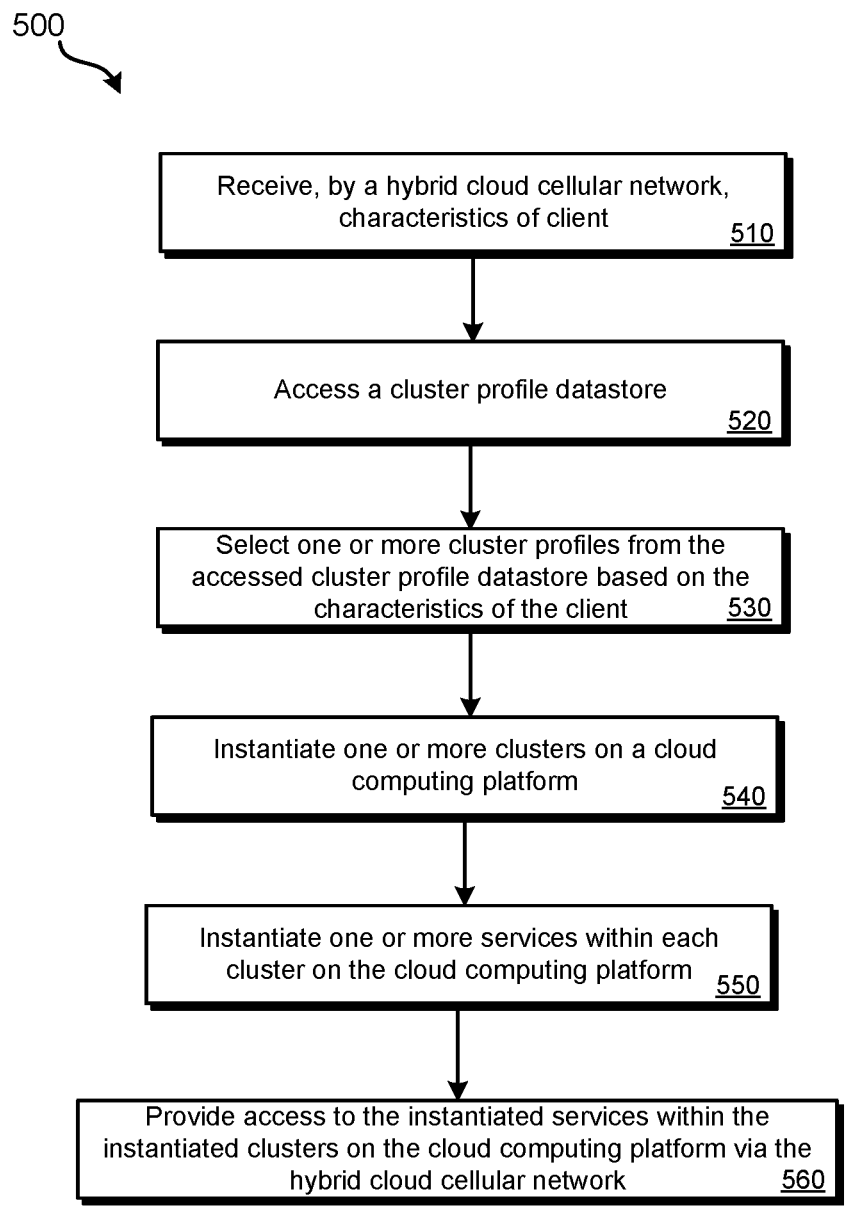
FIG. 5 illustrates an embodiment of a method for using virtual private network templates.

FIG. 5 illustrates an embodiment of a method 500 for using virtual network cluster templates. Method 500 can be performed using system 100, system 200, and manager 300. Specifically, each block of method 500 can be performed using client service manager 240, which can be executed directly on the cloud computing platform or on a computing system in communication with the cloud computing platform. Blocks of method 500 can be performed following method 400 of FIG. 4 being performed; alternatively, the cluster profiles may have been created in some other manner. For example, some number of multiple cluster profiles may be defined by an administrator of the cellular network.

At block 510, characteristics of a client for which one or more clusters are to be instantiated on the cloud computing platform are received. The characteristics of the client for which one or more clusters are to be instantiated can include: services to be executed on the cloud computing platform; number of devices expected to use each service; business line of the client; geographic regions of the client; performance requirements of the client; and QoE and/or QoS parameters used to create a slice for the client on the cellular network.

At block 520, a cluster profile datastore, such as cluster profile datastore 320 of FIG. 3, is accessed. The cluster profile datastore can be stored on the cloud computing platform as part of or in communication with the client service manager. The cluster profile datastore can also be stored on a computer system distinct from the cloud computing platform.

At block 530, one or more cluster profiles from the accessed cluster profile datastore are selected based on the characteristics of the client. Each selected cluster profile may be mapped to one or more services that are to be executed on the cloud computing platform on behalf of the client. As an example, the output of block 530 may be data that will perform instantiations on the cloud computing platform in accordance with Table 1.

TABLE 1

| Cluster Type | Services to be Executed in Cluster |
|---|---|
| Default | Service A3; Service C5; Service D1 |
| Performance Level 1 | Service XYZ |
| Performance Level 1 | Service F2; Service D5 |
| Performance Level 2 | Service 879 |

In the example of Table 1, three cluster template profiles were selected from the cluster profile datastore based on the characteristics of the user, with the cluster profile named "Performance Level 1" being used twice. Based on the selection, three services are mapped for execution within a "Default" cluster on the cloud computing platform, "service XYZ" is isolated in its own cluster, and so on.

At block 540, following approval or adjustments applied to each selected cluster profile by an administrator, each cluster may be instantiated on the cloud computing platform. The clusters may be instantiated on the cloud computing provider in association with an account directly managed by the client or via an account managed by the cellular network operator and a subaccount of the client with the cellular network operator. In either such arrangement, the cellular network operator may maintain the ability to directly administer the client's account and make updates to the definitions of the one or more clusters. At block 550, within each cluster, the services mapped at block 530 may be instantiated and executed.

At block 560, access to the services executed within the one or more clusters is provided to devices of the client. The access can be provided via multiple routes, such as: a network connection from the client device to the cloud computing provider; a wired network connection from the client device to the hybrid cellular network provider; and wirelessly from a client device via the RAN of the hybrid cellular network to the cloud computing provider. In some embodiments, all access to the clusters and services within the clusters on the cloud computing platform is provided via access to the hybrid cellular network, which in turn accesses the cloud computing platform.

In some embodiments, client services executed in the instantiated clusters can communicate directly with core functions of the hybrid cellular network within the cloud computing platform (that is, communication via a network external to the cloud computing platform is not needed). Such an arrangement can help decrease latency and jitter and increase bandwidth between the cellular network's core and the services of the client.

The access provided to the client devices of the client services is in the form of a private network. That is, other clients of the hybrid cellular network are not permitted any access to the client's clusters or services. The hybrid cloud cellular network can serve to provide multiple clients with their own private networks that can be accessed through the hybrid cloud cellular network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A virtual private network system implemented using a hybrid cloud cellular network, comprising:
    a hybrid cellular network, comprising:
        a radio access network (RAN) that comprises a plurality of base stations, wherein each base station comprises a radio unit (RU); antenna; and distributed unit (DU); and
        a cellular network core executed on a public cloud computing platform, wherein the cellular network core communicates with the plurality of base stations; and
    a client service manager system executed as part of the hybrid cellular network, the client service manager system configured to:
        receive a plurality of characteristics from a client;
        identify a cluster template based on the plurality of characteristics;
        instantiate a cluster based on the cluster template on the public cloud computing platform, wherein one or more client services are executed within the instantiated cluster on the public cloud computing platform; and
        execute, within the cluster, a client service, wherein access to the one or more client services executed within the cluster instantiated based on the cluster template are provided via the RAN of the hybrid cellular network.

2. The virtual private network system of claim 1, wherein the client service manager system is further configured to instantiate a second cluster based on a second cluster template on the public cloud computing platform, wherein an additional client service is executed within the second instantiated cluster on the public cloud computing platform for the client.

3. The virtual private network system of claim 2, wherein the cluster is instantiated having parameters that define a first performance level and the second cluster is instantiated having parameters that define a second performance level.

4. The virtual private network system of claim 3, wherein the second performance level of the second cluster comprises a greater amount of processing resource than the first performance level of the cluster.

5. The virtual private network system of claim 4, wherein the second performance level of the second cluster comprises a greater amount of memory than the first performance level of the cluster.

6. The virtual private network system of claim 1, wherein the cellular network core communicates directly with the one or more client services on the public cloud computing platform.

7. The virtual private network system of claim 1, further comprising a client device, wherein the client device accesses, via the RAN of the hybrid cellular network, the one or more client services executed within the cluster on the public cloud computing platform.

8. The virtual private network system of claim 1, wherein the public cloud computing platform is operated by an entity distinct from a cellular network operator that operates the hybrid cellular network.

9. The virtual private network system of claim 8, wherein the hybrid cellular network is a 5G New Radio (NR) cellular network.

* * * * *